United States Patent [19]

Bell

[11] Patent Number: 5,410,458
[45] Date of Patent: Apr. 25, 1995

[54] ILLUMINATED LANDSCAPE EDGING

[76] Inventor: Terence Bell, 18119 Bloom, Detroit, Mich. 48234

[21] Appl. No.: 218,617

[22] Filed: Mar. 28, 1994

[51] Int. Cl.⁶ .............................................. F21S 3/00
[52] U.S. Cl. .................................... 362/219; 362/223; 362/240; 362/249; 362/800
[58] Field of Search ............... 362/219, 223, 240, 249, 362/800

[56] References Cited

U.S. PATENT DOCUMENTS

| | | |
|---|---|---|
| 2,135,400 | 11/1938 | Johnson . |
| 2,920,184 | 1/1960 | Kessler . |
| 3,491,660 | 1/1970 | Kwasney . |
| 3,495,352 | 2/1970 | Sbare . |
| 4,357,653 | 11/1982 | Kovacs . |
| 4,945,675 | 8/1990 | Kendrick . |
| 5,057,981 | 10/1991 | Bowen et al. ........................ 362/249 |
| 5,180,223 | 1/1993 | McNamee ............................ 362/223 |
| 5,211,470 | 5/1993 | Frost et al. ........................... 362/800 |

OTHER PUBLICATIONS

Suncast Industrial Edging Product, Model IND20, of Suncast Corp., Batavia, Ill. 60510, dated at least as early as Jan. 1, 1994.

Primary Examiner—Carroll B. Dority
Attorney, Agent, or Firm—Peter D. Keefe

[57] ABSTRACT

An illuminated landscape edging composed of a planar member which is structured to be implanted into the ground and by a tubular member which is structured to be located above ground. In the preferred form of the invention, the tubular member is light passable and is provided with a slit running its length. Both the planar and tubular members are integrally constructed of plastic. The illuminated landscape edging is elongated and is provided in long rolls which may be cut into sections to suit the length needs of a particular landscaping job. Sections of the illuminated landscape edging are joined by a slotted tubular connector inserting into open ends of adjoining tubular members. A lighting string, such as miniature Christmas lights, is inserted into the tubular member via passage through the slit in the tubular member progressively therealong. A slot in the slotted tubular connector enables the lighting string to be passed therethrough, as well. At a selected location along the slit in the tubular member, the wiring of the lighting string exits the tubular member to be connected externally to a power source of electricity, which may be the home utility service or a solar energy storage power system. In the nighttime hours, the lighting string is illuminated, thereby providing a pleasant line of light which follows the predetermined demarcation pattern of the illuminated landscape edging.

12 Claims, 2 Drawing Sheets

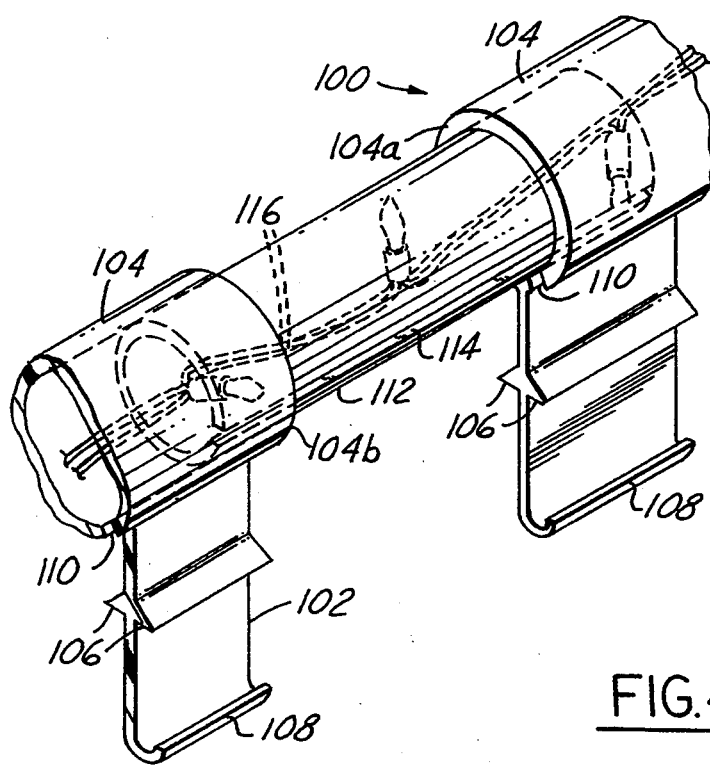
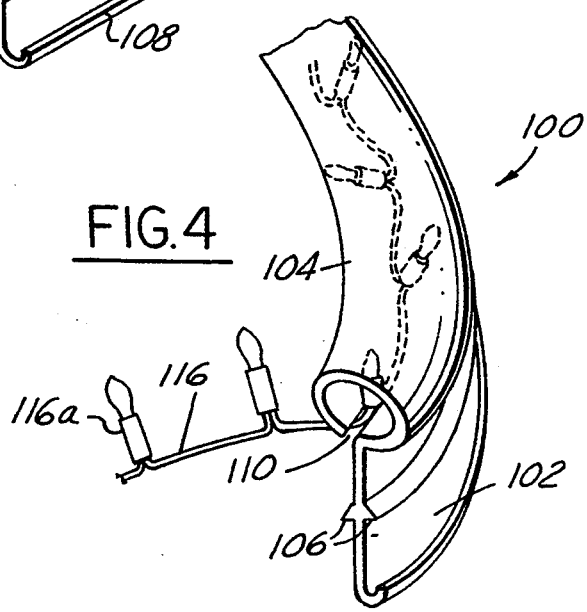
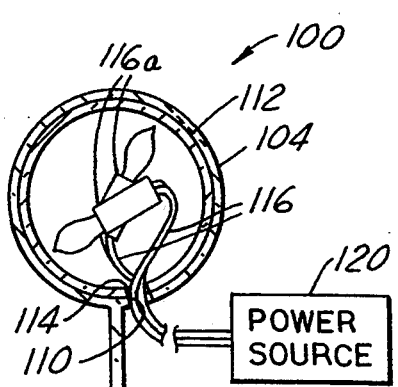
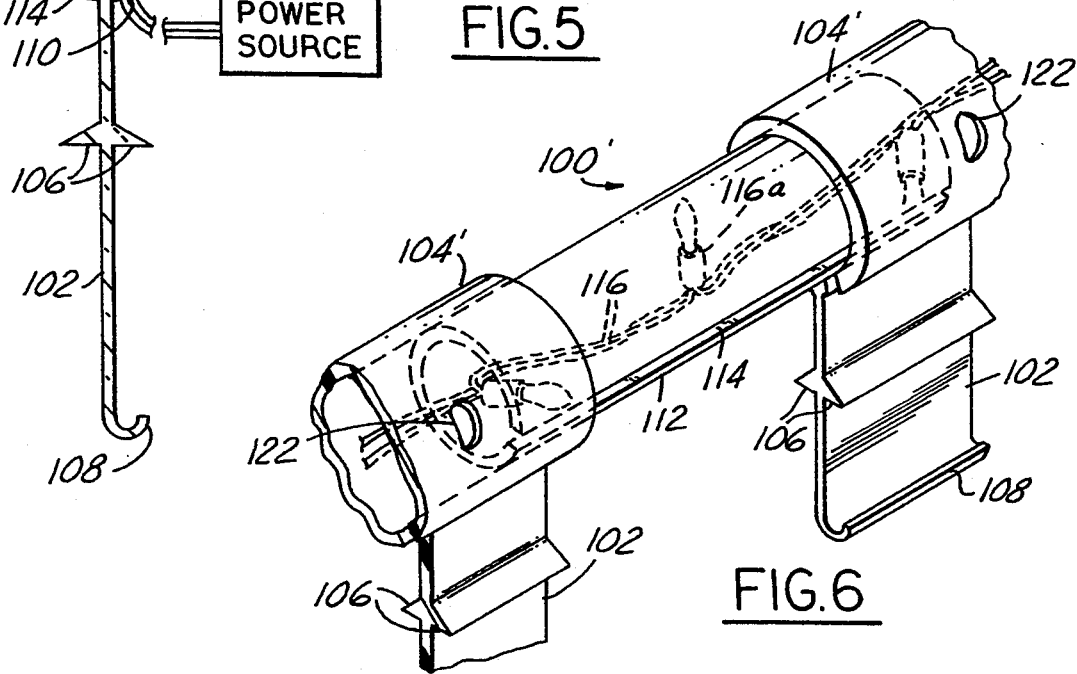

ILLUMINATED LANDSCAPE EDGING

BACKGROUND OF THE INVENTION

1. Field of the invention

The present invention relates to landscape edging used to demarcate areas of lawns, gardens and the like, and more particularly to an illuminated landscape edging.

2. Description of the Prior Art

Landscape edging is very widely used to provide demarcation between areas of lawns, gardens and the like. For instance, landscape edging may be used to form a barrier between botanical types, wherein, for example, on one side thereof is a lawn and on the other side thereof is a flower garden. In order to provide a barrier to passage therethrough of flora, landscape edging is implanted into the ground along the line of selected demarcation, and a portion thereof is located above the surface of the ground.

One very common type of landscape edging is depicted in FIG. 1. This prior art landscape edging 10 is characterized by a planar member 12 which is structured to be implanted into the ground and by a tubular member 14 which is structured to be located above ground. The planar member 12 is provided with a medial ribbing 16 and usually provided with an end hook 18. Both the medial ribbing 16 and the end hook 18 serve to anchor the planar member into the ground. This prior art landscape edging 10 is constructed of a plastic material, which is believed to be invariably black and opaque. The prior art landscape edging is elongated and is supplied in long rolls which may be cut into sections to suit the length needs of a particular landscaping job. Sections of the prior art landscape edging are serially joined by a tubular connector 20 inserting into open ends of adjoining tubular members 14.

Increasingly, homeowners are installing landscape lighting to illuminate their lawns and other landscape features. Usually, this form of illumination is in the form of a series of discrete lighting units which are partly implanted into the ground and which operate on a low voltage line supplied from the home utility service. These units can sometimes be the target of vandals or may be the accidental victims of an untoward incident, such as being hit by a lawn mower.

What is needed in the art is to somehow combine the benefits of landscape edging with the attractiveness of landscape lighting.

SUMMARY OF THE INVENTION

The present invention is a combination of landscape edging and landscape lighting, wherein the illumination so provided is pleasing and safe from harm.

The illuminated landscape edging according to the present invention is composed of a planar member which is structured to be implanted into the ground and by a tubular member which is structured to be located above ground. The planar member is optionally provided with a medial ribbing and an end hook for serving to anchor the planar member into the ground. In the most preferred form of the invention, the sidewall of the tubular member is constructed of a light passable material and is provided with a slit running its length. Both the planar and tubular members are integrally constructed of plastic. The illuminated landscape edging is elongated and is provided in long rolls which may be cut into sections to suit the length needs of a particular landscaping job. Sections of the illuminated landscape edging are serially joined by a slotted tubular connector inserting into open ends of adjoining tubular members.

A lighting string, such as miniature Christmas lights, is inserted into the tubular member via passage through the slit in the tubular member progressively therealong. A slot in the slotted tubular connector enables the lighting string to be passed therethrough, as well. At a selected location along the slit in the tubular member, the wiring of the lighting string exits the tubular member to be connected externally to a power source of electricity, which may be the home utility service or a solar energy storage power system of conventional manufacture.

In the nighttime hours, the lighting string is illuminated, thereby providing a pleasant line of light which follows the predetermined demarcation pattern of the illuminated landscape edging. The lighting string is encapsulated by the tubular member, thereby protecting it from injury. In the event any of the lights of the lighting string need service, it is a simple matter to access the subject light via the slit in the tubular member.

Accordingly, it is an object of the present invention to provide an illuminated landscape edging.

It is an additional object of the present invention to provide an illuminated landscape edging wherein the lighting thereof is protected from the environment and further is easily installed and serviced.

These, and additional objects, advantages, features and benefits of the present invention will become apparent from the following specification.

BRIEF DESCRIPTION OF THE DRAWINGS

FIG. 3 is a perspective view of the illuminated landscape edging according to the present invention, showing the structure for joining two pieces thereof together.

FIG. 4 is a perspective view of the illuminated landscape edging according to the present invention, showing installation of a lighting string with respect thereto.

FIG. 5 is a partly sectional end view of the landscape edging according to the present invention.

FIG. 6 is a perspective view of a modified form of the illuminated landscape edging.

DETAILED DESCRIPTION OF THE PREFERRED EMBODIMENT

Figure 1:
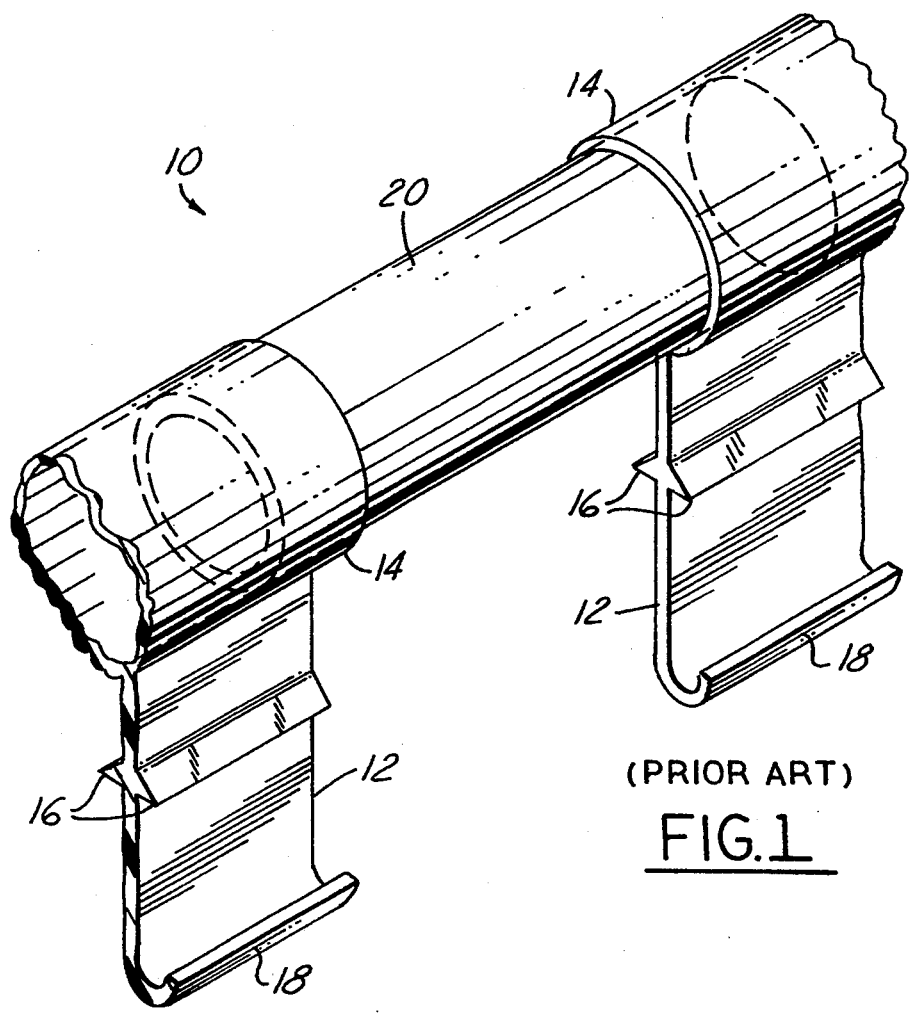
FIG. 1 is a perspective view of a prior art landscape edging.
Figure 2:
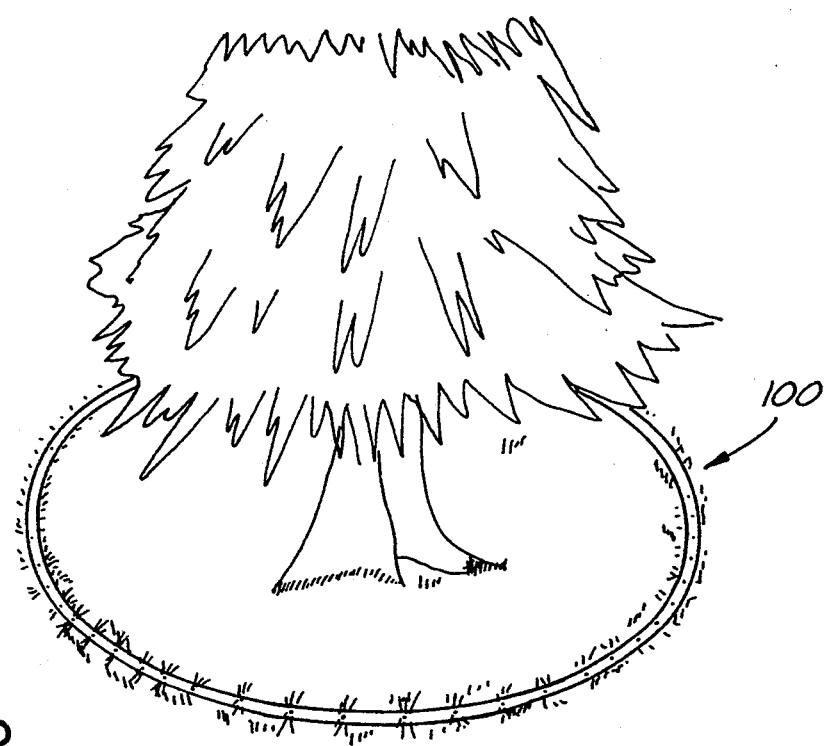
FIG. 2 is a perspective view of the illuminated landscape edging according to the present invention, shown in operation.

Referring now to FIGS. 2 through 4, the structure and function of the illuminated landscape edging 100 according to the present invention will be detailed.

The illuminated landscape edging 100 is composed of a planar member 102 which is structured to be implanted into the ground and by a tubular member 104 which is structured to be located above ground. The planar member 102 is preferably provided with a medial ribbing 106 and also preferably provided with an end hook 108, both of which optionally taking on any form suitable for serving to anchor the planar member into the ground. The sidewall of the tubular member 104 is constructed of a light passable material, and may be optionally translucent, colored, clear, frosted, or selectively otherwise, but in any event able to pass light therethrough. The sidewall of the tubular member may be of any cross-sectional shape and is not limited only to the preferred circular cross-section shown in the Drawing, such as for example a rectangular cross-sectional shape. The sidewall of the tubular member 104 is provided with a slit 110 running its length in parallel alignment with the planar member 102, preferably located adjacent the planar member.

The planar member 102 and the tubular member 104 are connected together, preferably being mutually integrally connected. Both the planar and tubular members 102, 104 are constructed of plastic. The planar member may or may not be light passable, however as a practical manufacturing matter, both the tubular and planar members 102, 104 may be formed by a standard plastic forming process, wherein both would be constructed of the same plastic material. The illuminated landscape edging 100 is elongated and is preferably provided in long rolls which may be cut into sections to suit the length needs of a particular landscaping job, as for instance shown in FIG. 2.

Sections of the illuminated landscape edging are serially joined together by inserting a slotted tubular connector 112 into open ends 104a, 104b of adjacent tubular members 104, as shown in FIG. 3, and then abutting the open ends together. The sidewall of the slotted tubular connector 112 is provided with a slot 114.

A lighting string 116, such as miniature Christmas lights, is inserted into the tubular member 104 via passage thereof through the slit 110 in the tubular member progressively therealong, as shown in FIG. 4. The slot 114 in the slotted tubular connector 112 enables the lighting string 116 to be passed therethrough, as well (which may be facilitated by alignment of the slot 114 with the slit 110). As can be understood from FIG. 5, at a selected location along the slit 110 in the tubular member 104, the wiring 118 of the lighting string 116 exits the tubular member 104 to be connected externally to a power source of electricity 120, which may be, for instance, the home utility service or a solar energy storage power system of conventional manufacture, and which is preferably supplying a safe low voltage for which the lights 116a of the lighting string are adapted.

In the nighttime hours, the lighting string 116 is illuminated, thereby providing a pleasant line of light which follows the predetermined demarcation pattern of the illuminated landscape edging 100. The lighting string 116 is encapsulated by the tubular member 104, thereby protecting it from injury. In the event any of the lights 116a of the lighting string 116 need service, it is a simple matter to access the subject light via the slit 110 in the tubular member 104, and if needed, the slot 114.

It will be understood that the exact form of the lighting string may vary. It may have incandescent, neon, fluorescent or other sources of illumination, and the lighting string may itself be composed of a string of discrete lights or may be a continuous light string.

A light passing tubular member is the most preferred form of illuminated landscape edging 100. However, as shown in FIG. 6, an alternative form of the illuminated landscape edging 100' may utilize a tubular member 104' that is conventionally opaque, but is provided with a plurality of discrete holes 122 running periodically placed along its length through which the illumination from the lighting string 116 shines.

Further, it is possible to provide the tubular member of the illuminated landscape edging as shown in FIGS. 3 and 6 but without a slit, wherein the lighting string is threaded therethrough from one end to the other, as well as being threaded through the connector members. This form of the invention is not preferred in that servicing of the lighting string is difficult to perform.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. An illuminated landscape edging for being installed partly above ground and partly below ground, comprising:
   at least one landscape edging section, each landscape edging section comprising:
      a tubular member having a sidewall of predetermined cross-sectional shape, said sidewall having a first and second end, said sidewall being provided with a slit, said sidewall being composed of a light passable plastic material; and
      a planar member connected with said tubular member for providing an anchorage below ground and for affixing said tubular member at a preselected location above ground;
   illumination means located in said tubular member of each said landscape edging section for providing illumination therein; and
   means for connecting said illumination means to a source of electricity;
   wherein said illumination provided by said illumination means passes through said sidewall of each said landscape edging section so as to be visible exterior thereto; and
   wherein said slit extends along said sidewall in parallel alignment with respect to said planar member to thereby permit said illumination means to be passed therethrough in order to at least in part insert said illumination means into said tubular member and further to at least in part remove said illumination means from said tubular member.

2. The illuminated landscape edging of claim 1, further comprising slotted connector member means for serially connecting together said first and second ends of the sidewall of each said section; wherein said slotted connector member means is provided with a slot to thereby permit said illumination means to be passed therethrough in order to at least in part insert said illumination means into said tubular member and further to at least in part remove said illumination means from said tubular member.

3. The illuminated landscape edging of claim 2, wherein said tubular member and said planar member are mutually integrally connected together.

4. The illuminated landscape edging of claim 3, wherein said illumination means comprises a string of lights located in said tubular member.

5. The illuminated landscape edging of claim 4, wherein said means for connecting comprises wiring means for providing electrical power between said string of lights and a power source of electricity.

6. The illuminated landscape edging of claim 5, wherein said power source of electricity is a solar energy storage power source.

7. An illuminated landscape edging for being installed partly above ground and partly below ground, comprising:

at least one landscape edging section, each landscape edging section comprising:

a tubular member having a sidewall of predetermined cross-sectional shape, said sidewall having a first and second end, said sidewall being provided with a slit, said sidewall being provided with a plurality of mutually spaced apart holes; and a planar member connected with said tubular member for providing an anchorage below ground and for affixing said tubular member at a preselected location above ground;

illumination means located in said tubular member of each said landscape edging section for providing illumination therein; and means for connecting said illumination means to a source of electricity;

wherein said illumination provided by said illumination means passes through said plurality of holes in said sidewall of each said landscape edging section so as to be visible exterior thereto; and and further to at least in part remove said illumination means from said tubular member.

8. The illuminated landscape edging of claim 7, further comprising slotted connector member means for serially connecting together said first and second ends of the sidewall of each said section; wherein said slotted connector member means is provided with a slot to thereby permit said illumination means to be passed therethrough in order to at least in part insert said illumination means into said tubular member and further to at least in part remove said illumination means from said tubular member.

9. The illuminated landscape edging of claim 8, wherein said tubular member and said planar member are mutually integrally connected together.

10. The illuminated landscape edging of claim 9, wherein said illumination means comprises a string of lights located in said tubular member.

11. The illuminated landscape edging of claim 10, wherein said means for connecting comprises wiring means for providing electrical power between said string of lights and a power source of electricity.

12. The illuminated landscape edging of claim 11, wherein said power source of electricity is a solar energy storage power source.

* * * * *